Patented Dec. 17, 1946

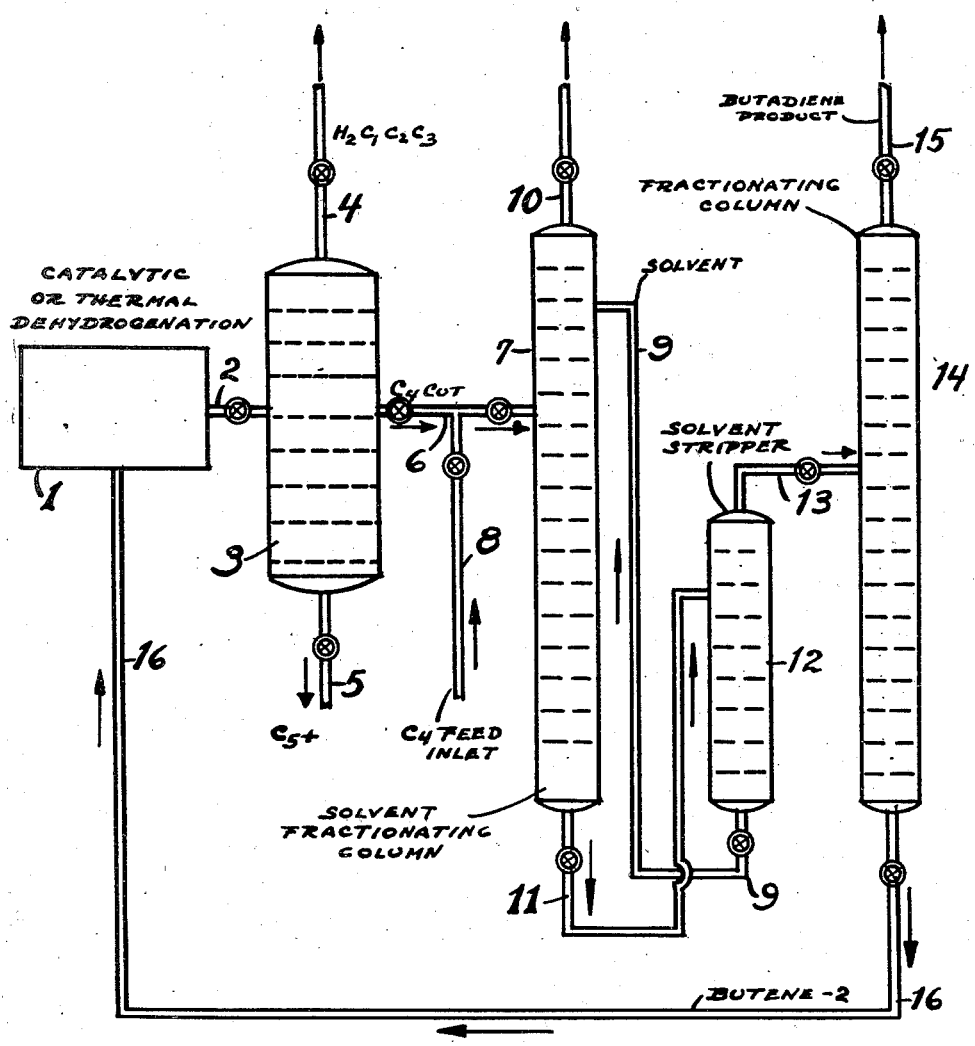

2,412,911

UNITED STATES PATENT OFFICE 2,412,911

BUTADIENE MANUFACTURE

Harold W. Scheeline, Elizabeth, N. J., assignor to Standard Oil Development Company, a corporation of Delaware Application July 26, 1944, Serial No. 546,674

5 Claims. (Cl. 260—680)

This invention relates to improvements in the manufacture of butadiene and relates particularly to improvements in the dehydrogenation of a cracked petroleum fraction known as a cracked $C_4$ cut to obtain butadiene with a minimum number of process steps.

The hydrocarbons normally present in a cracked $C_4$ cut such as are obtained by the usual methods of separating cracked petroleum products into distillate or condensate fractions based on differences in boiling points, include normal butane (B. P. 31.1° F.), isobutane (B. P. 10.8° F.), n-butene-1 (B. P. 20.7° F.), cis-n-butene-2 (B. P. 38.7° F.), trans-n-butene-2 (B. P. 33.8° F.), isobutene (B. P. 19.8° F.), and 1,3 butadiene (B. P. 23.9° F.). The normal butenes may be readily converted to butadiene by dehydrogenation over suitable catalysts, but other $C_4$ hydrocarbons, particularly isobutylene, are much more difficult to dehydrogenate and are largely unaffected by conditions most suitable for catalytic dehydrogenation of the n-butenes. Hence, it is desirable to exclude them from the dehydrogenation treatment, as they reduce the concentration of butadiene in the resulting products and build up rapidly in any recycle operation which is used, thereby increasing the cost of separating butadiene from the dehydrogenation products and reducing the yield by requiring additional fractionation of the products and by limiting the amount of unconverted products which can be profitably recycled. However, the boiling points of isobutene (19.8° F.) and of butene-1 (20.7° F.) are so close together that the separation of these materials by distillation is extremely difficult and is not usually accomplished. Also, the boiling point of n-butane is intermediate between that of butene-1 and the two butenes-2. Thus separation of the normal butenes from the other $C_4$ hydrocarbons by distillation is extremely difficult and so expensive as to be not economically practical. Only isobutane may be separated fairly readily by distillation. Separation of normal butenes by other methods involving the use of selective solvents, etc., also involves a considerable expense, and elimination of isobutylene cannot normally be effected by this means since it is so close to butene-1 not only in boiling point but also in unsaturation.

The usual method of preparing the feed for the dehydrogenation step consists of fractionating to remove isobutane, most of the isobutylene and butene-1, and part of the normal butane from the feed $C_4$ cut, and recovering a material consisting chiefly of butene-2, but containing some normal butane. This material is fed to the dehydrogenation step and light gases, heavy material, and butadiene are removed from the dehydrogenation products and the remaining $C_4$ material is recycled to the dehydrogenation step. Under this method of operation, butanes and isobutylene are usually permitted to build up to about 25% of the total dehydrogenation feed stream, thus necessitating a corresponding increase in the size of the dehydrogenation equipment. In addition, it is to be noted that separate process units are required for feed preparation and butadiene recovery.

An object of this invention is to provide a process by which improved yields of butadiene from the $C_4$ cut are obtained.

Another object of this invention is to provide a process in which a minimum of equipment for distillation, dehydrogenation, extraction and fractionation is required.

Other objects of the invention will be seen upon reading the following description of the invention with reference to the accompanying drawing which represents a diagrammatic illustration in partial sectional elevation of suitable equipment for carrying out one modification of the invention and indicates the flow of materials.

The present invention covers a process in which the feed preparation and butadiene recovery equipment are combined. In the manufacture of butadiene by thermal or catalytic dehydrogenation of normal butene, the $C_4$ cut which may be segregated from other dehydrogenation products contains butadiene in admixture with other hydrocarbons from which it is not practical to separate the butadiene by simple fractionation. The $C_4$ mixture may, however, be treated in the vapor phase with a liquid extraction agent, such as acetone, acetone plus water, furfural or furfural plus water in the presence of which the volatility of butadiene is substantially reduced with respect to the other $C_4$ constituents so that the butadiene can be removed selectively in the solvent phase. This is sometimes referred to as extractive distillation. The extraction is simplified if cis- and trans-butene-2 are removed in the solvent with the butadiene, since butene-2 in the presence of the solvent has a volatility closely approaching that of the diolefin. After the solvent is removed, however, the butadiene and butene-2 are separable by ordinary fractionation.

Referring to the drawing, the products from the dehydrogenation unit 1 are passed through pipe 2 to fractionating tower 3. In the fractionating tower 3 the products are freed of $C_3$ hydrocarbons and lighter constituents which are removed overhead through pipe 4. C5 hydrocarbons and heavier constituents are passed through pipe 5, a side cut consisting of the C4 hydrocarbon cut being removed through pipe 6 and passed to extractive distillation tower 7. Into pipe 6 is likewise passed the feed stock or the C4 cut through pipe 8 which is mixed with the dehydrogenation product after it has been freed of its lower and higher boiling constituents. Into extractive distillation tower 7 is passed by means of pipe 9 a solvent such as acetone or acetone and water. Heat is supplied, and through overhead outlet 10 is passed isobutane, isobutene, n-butane and butene-1. The solvent with the butadiene and butene-2 in solution is then passed through pipe 11 into solvent stripper 12 where butene-2 and butadiene are passed overhead through pipe 13 and the solvent free of butadiene and butene-2 removed to solvent extraction tower 7 by means of pipe 9. Butadiene and butene passing through pipe 13 into fractionating tower 14 are heated further to fractionate butadiene as an overhead product to pipe 15 and butene-2 is recycled through pipe 16 to the dehydrogenation unit 1.

By the use of this process, a high yield of butadiene on butene-2 can be obtained since it is unnecessary to discard any butene-2 in order to prevent buildup in the dehydrogenation recycle circuit of isobutylene and other materials. The stream recycled to the dehydrogenation unit will be butene-2 of high purity, thus minimizing the size of the dehydrogenation equipment. Finally, no separate equipment is required to fractionate the C4 feed material.

It is to be noted that butene-1, despite the fact that it is a suitable feed material for dehydrogenation to butadiene, is lost from the system under this method of operation. This loss may well be approximately one-third of the normal butene available in the feed stream. In addition, any butene-1 formed by isomerization of butene-2 during passage through the dehydrogenation unit is lost in the overhead from the solvent extraction tower. In case this loss of butene-1 is too large to permit the manufacture of a desired amount of butadiene from a given C4 feed stream, the butene-1 may be recovered from the overhead from the solvent extraction tower by a combination of known methods. For example, isobutylene may be removed by the selective action of 65% $H_2SO_4$, the resulting mixture of butene-1 and butanes may then be subjected to $H_2SO_4$ treatment under conditions for isomerizing butene-1 to butene-2 and the butene-2 recovered from the resulting C4 cut by the action of a selective solvent. The butene-2 thus recovered may be added to the stream fed to the dehydrogenation unit. In many commercial applications, however, other uses exist for butene-1 where isobutane and isobutylene will not have any disadvantageous effect. One example is alkylation. In such cases, manufacture of butadiene from all or part of the available butene-2 and simultaneous manufacture of alkylate from the remainder of the butene-2 and the butene-1 will often be economically desirable.

I claim:

1. Improved process for the production of butadiene from a cracked petroleum fraction which comprises passing a petroleum fraction consisting substantially of butene-2 to a catalytic dehydrogenation zone to convert the butene-2 to butadiene, separating the dehydrogenated products from the catalytic dehydrogenation zone, separating from the dehydrogenated products hydrocarbons having three or less carbon atoms and five or more carbon atoms to the molecule, mixing the residual hydrocarbons having four carbon atoms to the molecule with a hydrocarbon fraction having four carbon atoms to the molecule and obtained by cracking a petroleum oil, subjecting this mixture to extraction distillation in the presence of a solvent having a preferential solvent action for butadiene and butene-2 and which solvent reduces the volatility of butadiene and butene-2 with respect to the other hydrocarbons other than butadiene and butene-2, separately distilling the solvent having a preferential action for butadiene and containing butadiene and butene-2 to separate the butadiene and butene-2, fractionally separating butadiene and butene-2 and recycling the butene-2 to the dehydrogenation unit.

2. Process according to claim 1 in which the solvent having a preferential solvent action for butadiene is acetone.

3. Process according to claim 1 in which the solvent having a preferential solvent action for butadiene is acetone plus water.

4. Process according to claim 1 in which the solvent having a preferential solvent action for butadiene is furfural.

5. Process according to claim 1 in which the solvent having a preferential solvent action for butadiene is furfural plus water.

HAROLD W. SCHEELINE.